United States Patent
Ledendecker

(10) Patent No.: US 9,002,540 B2
(45) Date of Patent: Apr. 7, 2015

(54) METHOD FOR OPERATING AN AUTHORIZATION DEVICE FOR A KEYLESS ACCESS TO AND START OF A VEHICLE

(71) Applicant: Audi AG, Ingolstadt (DE)

(72) Inventor: Ingo Ledendecker, Buxheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/350,913

(22) PCT Filed: Sep. 25, 2012

(86) PCT No.: PCT/EP2012/004006
§ 371 (c)(1),
(2) Date: Apr. 10, 2014

(87) PCT Pub. No.: WO2013/053429
PCT Pub. Date: Apr. 18, 2013

(65) Prior Publication Data
US 2014/0303811 A1    Oct. 9, 2014

(30) Foreign Application Priority Data

Oct. 14, 2011   (DE) .......... 10 2011 116 157

(51) Int. Cl.
*G05D 1/00*     (2006.01)
*B60R 25/24*    (2013.01)
*G07C 9/00*     (2006.01)

(52) U.S. Cl.
CPC ............ *B60R 25/24* (2013.01); *G07C 9/00944* (2013.01); *G07C 9/00111* (2013.01); *G07C 2009/00325* (2013.01); *G07C 2009/00547* (2013.01)

(58) Field of Classification Search
CPC ....................................................... B60R 25/24
USPC ........... 701/2; 340/5.72, 426.28, 5.64, 426.36
See application file for complete search history.

(56) References Cited

U.S. PATENT DOCUMENTS

2007/0229301 A1    10/2007   Katz

FOREIGN PATENT DOCUMENTS

| DE | 19937915 | | 3/2000 |
|----|----------|---|--------|
| DE | 19937915 | A1 * | 3/2000 |
| DE | 19855605 | | 6/2000 |
| DE | 19927253 | | 1/2001 |

(Continued)

OTHER PUBLICATIONS

German Office Action for German Priority Patent Application No. 10 2011 116 157.4, issued May 23, 2012, 5 pages.

(Continued)

*Primary Examiner* — Thomas G Black
*Assistant Examiner* — Luke Huynh
(74) *Attorney, Agent, or Firm* — Staas & Halsey LLP

(57) ABSTRACT

A method for operating an authorization device for keyless entry and starting of a vehicle with a portable ID transmitter that has a motion sensor. A wireless communication link for interchanging data messages can be set up between the authorization device and the ID transmitter. Keyless entry to the vehicle is permissible only when an instant of last movement of the ID transmitter, as captured by the motion sensor, is within a stipulated interval of time. The authorization device permits keyless starting of the vehicle only when keyless entry to the vehicle has previously been permitted.

12 Claims, 1 Drawing Sheet

(56) References Cited

FOREIGN PATENT DOCUMENTS

| | | |
|---|---|---|
| DE | 10354646 | 8/2005 |
| DE | 102011116157.4 | 10/2011 |
| DE | 102011050160 | 11/2012 |
| FR | 2786802 | 6/2000 |
| WO | 2011/054717 | 5/2011 |
| WO | 2012/119681 | 9/2012 |
| WO | PCT/EP2012/004006 | 9/2012 |

OTHER PUBLICATIONS

English Language International Search Report for PCT/EP2012/004006, mailed Jan. 15, 2013, 3 pages.

WIPO English Language Translation of the International Preliminary Report on Patentability for PCT/EP2012/004006, mailed Apr. 17, 2014, 8 pages.

* cited by examiner

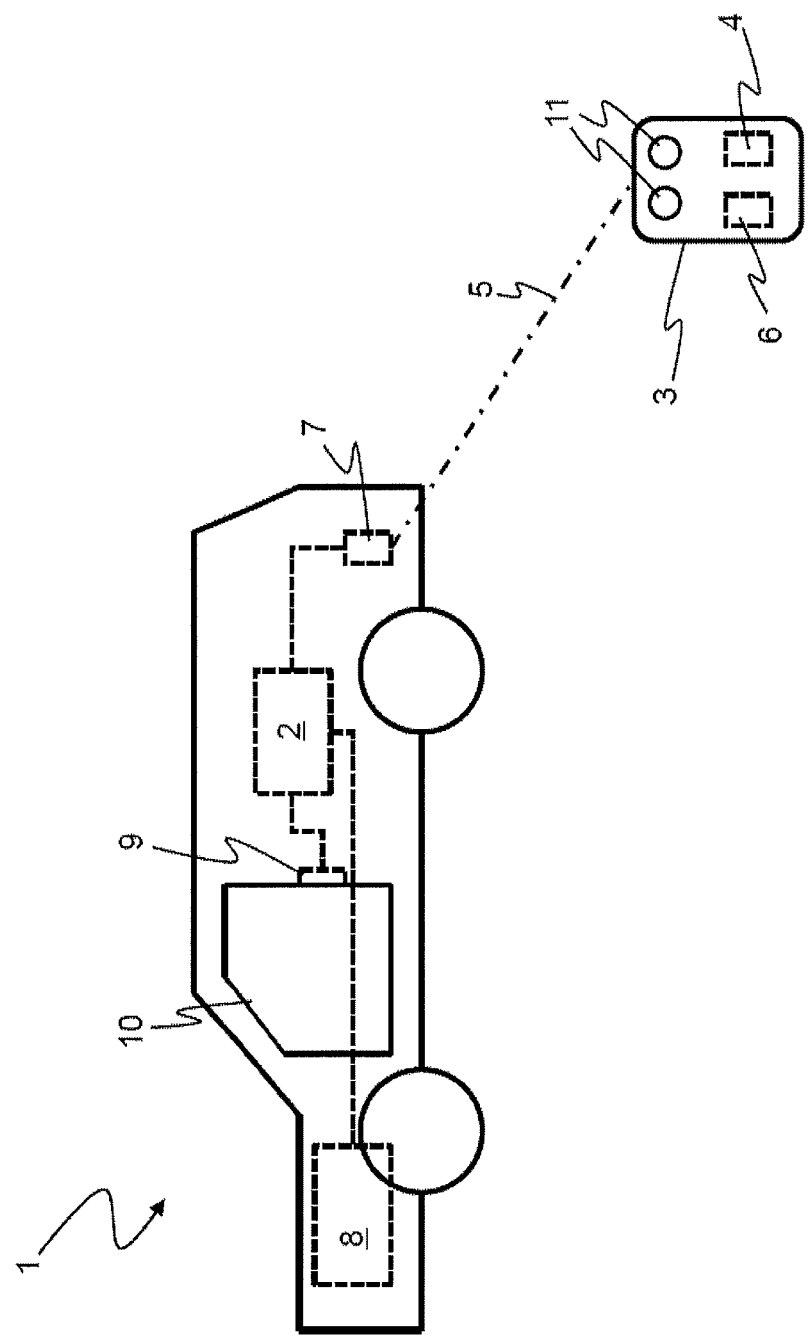

METHOD FOR OPERATING AN AUTHORIZATION DEVICE FOR A KEYLESS ACCESS TO AND START OF A VEHICLE

CROSS REFERENCE TO RELATED APPLICATIONS

This application is based on and hereby claims priority to International Application No. PCT/EP2012/004006 filed on Sep. 25, 2012 and German Application No. 10 2011 116 157.4 filed on Oct. 14, 2011, the contents of which are hereby incorporated by reference.

BACKGROUND

The invention relates to a method for operating an authorization device for keyless entry and starting of a vehicle, comprising a portable ID transmitter that the authorization device can use to set up a wireless communication link for interchanging data messages.

Such authorization devices are used in vehicle construction for conveniently checking an identity of an ID transmitter and are also know as passive keyless entry/go systems, inter alia. In this case, the authorization device uses suitable a transmission/reception device to set up a wireless communication link with a limited range to portable ID transmitters within this range. The authorization device and the ID transmitters then interchange data messages with one another in order to establish the authorization of the ID transmitter for this specific vehicle.

However, there is the possibility of criminals greatly increasing the range of the communication link and, as a result, interchange of data messages between ID transmitter and authorization device taking place over long ranges (what is known as a relay attack). By way of example, it is thus conceivable for a criminal to position himself with a transmission/reception device next to a parked vehicle and to position a further transmission/reception device in proximity to the appropriate ID transmitter, for example on a house or apartment door, wardrobe, etc. The inconspicuously increased range allows the criminal at the vehicle to gain entry thereto and to start the engine.

Document DE 199 37 915 A1 describes an electronic key for contactlessly unlocking a motor vehicle with a transmission unit for emitting an identification signal when a stimulus signal appears. When the identification signal matches a signal stored in the motor vehicle, an actuation signal is output in the motor vehicle to the central locking system to open or close the vehicle doors and/or to an engine immobilizer to activate or deactivate the drive of the motor vehicle. In the absence of movement of the key for a prescribed period of time, the key is switched off.

The document FR 2 786 802 A1 discloses a radio key with a motion detector, wherein the radio key has a receiver that is activated only if the motion detector has previously detected a movement by the radio key.

The document WO 2012/119681 A1 describes a mobile transmission apparatus in an entry system for a vehicle, which apparatus has a transmitter for sending an entry enable signal for enabling entry to the vehicle. A processing unit of the transmission apparatus is designed to take a captured motion state and a first request signal as a basis for using the transmitter to send a first entry enable signal, and to take a second request signal, independently of the captured motion state, as a basis for using the transmitter to send a second entry enable signal. An entry control apparatus for the vehicle is designed to enable first entry to the vehicle on the basis of the first entry enable signal from the transmitter and second entry to the vehicle on the basis of the second entry enable signal. By way of example, the first entry may be central locking of the vehicle, and the second entry may be enabling of an ignition system in the vehicle.

The document DE 10 2011 050 160 A1 describes an identification transmitter for a closing system for a vehicle, which transmitter has a motion sensor that is designed to sense a movement of the identification transmitter. Provision is made for at least one reception unit of the identification transmitter to be shut down by a microcontroller when the motion sensor senses no movement from the identification transmitter during a minimum period of time.

The document DE 103 54 646 A1 reveals to a person skilled in the art the teaching that, in the case of a driving authorization system in a vehicle, the system needs to detect that an enabling device that is authorized for use is in proximity to the vehicle, and then both the vehicle is unlocked and engine starting is enabled.

The generic DE 199 27 253 A1 discloses a method for performing an authorization check between a controller and a portable transponder that communicates wirelessly with the controller. The performance of an authorization check additionally involves checking whether or not the transponder has been moved during a predetermined interval of time before the authorization check is performed. The transponder sends its identity code only if a transponder movement that is above a particular threshold value has been captured during the predetermined interval of time. Hence, a relay attack cannot be performed on transponders that are at rest for a relatively long time. However, a disadvantage is that this method can be used in practice only for entry authorization, but not for start authorization. If the driver remains in a vehicle for a relatively long time with the engine switched off, for example, the key that is deactivated after the interval of time has elapsed would prevent the engine from being started until said key is activated again by a movement. This is a considerable detriment to convenience.

SUMMARY

One potential object is to provide a method for operating an authorization device for entry and starting of a vehicle that provides a good level of protection against a relay attack while simultaneously providing a high level of convenience for the user.

The inventor proposes a method for operating an authorization device for keyless entry and starting of a vehicle with a portable ID transmitter that has a motion sensor, wherein a wireless communication link for interchanging data messages can be set up between the authorization device and the ID transmitter and wherein keyless entry to the vehicle is permissible only when an instant of last movement of the ID transmitter, as captured by the motion sensor, is within a stipulated interval of time and wherein the authorization device permits keyless starting of the vehicle only when keyless entry to the vehicle has previously been permitted.

Since keyless starting of an engine in the vehicle is possible whenever keyless entry to the vehicle has previously been granted, there is no need for a fresh check on the motion sensor of the ID transmitter for the case of starting, since there is a high probability of legitimate use already having been able to be established. The user can therefore open the vehicle with the usual convenience of a keyless entry system, for example by placing his hand around a door handle on a vehicle door, this being captured by a capacitive sensor incorporated in the door handle. In the present case, keyless also means entry or starting without active operation of the ID transmitter. The detection of a hand applied to the door handle triggers the setup of the wireless communication link between the authorization device and the ID transmitter for the purpose of interchanging the data messages that are required for the authorization check. The wireless communication link is preferably produced by a vehicle-end transmission/reception device and a corresponding transmission/reception device in the ID transmitter. Keyless entry to the vehicle that has actually been effected can be detected as a result of the unlocking of a vehicle door, for example, and can be stored in the authorization device. Keyless starting of the vehicle is then possible until the vehicle doors have been centrally locked again. The starting of the vehicle or of the engine thereof can be regulated by an engine immobilizer and/or an engine controller. The connection between the instant and the interval of time can be checked either by the authorization device or by the ID transmitter. By way of example, it is thus possible for the ID transmitter to send no response or a negative response to the authorization device if an instant is outside the interval of time.

In one preferred embodiment, the authorization device receives the instant from the ID transmitter and matches it against the interval of time. The matching between the instant and the interval of time is therefore effected at the vehicle in the authorization device. A communication link between the authorization device and the ID transmitter is accordingly always possible regardless of the relationship between the instant and the interval of time. The authorization device then decides, as a result of the matching, whether entry to the vehicle is granted (instant within interval of time) or continues to be refused (instant outside interval of time).

In one preferred embodiment, only that ID transmitter to which keyless entry has previously been granted is permitted keyless starting. This increases security further, since the natural course of putting the vehicle into operation as the vehicle is approached, unlocking the vehicle doors and starting an engine in the vehicle is usually performed using the same ID transmitter. An anomaly as a result of the use of different ID transmitters for entry and starting establishes a suspicious fact that can be countered by this measure.

In one preferred embodiment, keyless starting is always permitted following manual entry using the same ID transmitter. In this connection, manual entry can be understood to mean either the use of a mechanical lock incorporated on the vehicle with a key integrated in the ID transmitter or unlocking of the vehicle doors that is initiated by the user, for example by pushing a key on the ID transmitter.

In one preferred embodiment, the interval of time is monitored by an RC element. The capacitor that is charged when movement of the ID transmitter is captured quietly discharges again slowly via the resistor. The residual voltage that remains in the capacitor provides information about whether the instant is still within the interval of time. This allows the interval of time to be monitored purely using hardware without the aid of software.

BRIEF DESCRIPTION OF THE DRAWINGS

These and other objects and advantages of the present invention will become more apparent and more readily appreciated from the following description of the preferred embodiments, taken in conjunction with the accompanying drawings of which:

In the drawing, the FIGURE shows a schematic view of a vehicle with an authorization device and an ID transmitter.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

As shown in the FIGURE, a vehicle 1 has at least one vehicle door 10 that can be locked and unlocked by a door lock 9. An engine 8 is used to move the vehicle 1. The vehicle 1 contains an authorization device 2 for keyless entry and starting of the vehicle 1. The authorization device 2 acts on the at least one door lock 9 to control entry via the vehicle door 10 and indirectly or directly on the engine 8 to control starting. An ID transmitter 3 that can be carried by a user has transmission/reception device 6 that can set up a wireless communication link 5 to a corresponding transmission/reception device 7 in the vehicle 1. The vehicle-end transmission/reception device 7 are controlled by the authorization device 2, as a result of which the authorization device 2 can use these to interchange data messages with the ID transmitter 3 via the communication link 5. The ID transmitter 3 also has a motion sensor 4 that can capture an instant of last movement of the ID transmitter 3. When the user desires keyless entry to the vehicle 1, the authorization device 2 requests the instant of last movement of the ID transmitter 3 that is within range of the transmission/reception device 7 and compares said instant with a stored interval of time. If the instant is within the interval of time, entry is granted. If the instant is outside the interval of time, entry is refused. Alternatively, the ID transmitter evaluates the interval of time and sends a positive or negative or no response on the basis of the evaluation result. In the latter case, the user would need either to move the ID transmitter 3 or to perform manual unlocking of the at least one door lock 9 using an operating pushbutton switch 11 arranged on the ID transmitter 3. The further operating pushbutton switch 11 is used for manually locking the at least one door lock 9. The engine 8 can subsequently be started keylessly only if the last unlocking of the at least one door lock 9 took place wirelessly or manually using the same ID transmitter 3. Otherwise, the engine 8 needs to be started manually, for example using an ignition lock, which is not shown. If the at least one door lock 9 is locked, the authorization device 2 rejects the authorization of the ID transmitter 3 for keyless starting.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for operating an authorization device for keyless entry and keyless starting of a vehicle using a portable ID transmitter that includes a motion sensor, the method comprising:

receiving, by the authorization device from the ID transmitter over a wireless communication link, an instant of last movement of the ID transmitter as captured by the motion sensor;

performing a first authorization check comprising comparing, by the authorization device, the instant of last movement of the ID transmitter as captured by the motion sensor, with a predetermined interval of time;

permitting keyless entry to the vehicle only if the instant of last movement of the ID transmitter as captured by the motion sensor is within the predetermined interval of time;

performing a second authorization check comprising checking whether entry to the vehicle was permitted via keyless entry and the first authorization check, the first authorization check being performed before the second authorization check; and permitting, by the authorization device, keyless starting of the vehicle if entry to the vehicle was permitted by keyless entry and the first authorization check.

2. The method as claimed in claim 1, wherein the permitting, by the authorization device, keyless starting of the vehicle, further comprises:

permitting keyless starting to only the ID transmitter to which keyless entry was permitted.

3. The method as claimed in claim 1, further comprising:

gaining manual entry to the vehicle using a device which includes the ID transmitter; and permitting keyless starting following manual entry if the ID transmitter included in the device used for manual entry is the same as the ID transmitter used for keyless starting.

4. The method as claimed in claim 3, wherein the gaining manual entry comprises unlocking a vehicle door by applying pressure to a switch disposed on device which includes the ID transmitter, or unlocking a vehicle door via a mechanical lock incorporated in the vehicle using the device.

5. The method as claimed in claim 1, wherein the interval of time is monitored using an RC element.

6. The method as claimed in claim 5, wherein the RC element includes a capacitor which is charged when movement of the ID transmitter is captured by the motion sensor, and the capacitor discharges via a resistor included in the RC element, and the comparing further comprises:

determining whether the instant of last movement of the ID transmitter as captured by the motion sensor is within the predetermined interval of time, based upon a residual voltage remaining in the capacitor.

7. The method as claimed in claim 1, further comprising:

detecting a human body part applied to a door of the vehicle; and in response to the detecting of the human body part, establishing the wireless communication link between the authorization device and the ID transmitter.

8. The method as claimed in claim 7, wherein after establishing the wireless communication link between the authorization device and the ID transmitter, the authorization device requests the ID transmitter to transmit the instant of last movement of the ID transmitter to the authorization device.

9. The method as claimed in claim 1, wherein the authorization device permits keyless starting of the vehicle if entry to the vehicle was permitted by keyless entry, until the vehicle doors are locked.

10. The method as claimed in claim 1, wherein the second authorization check comprises:

checking whether entry to the vehicle was permitted via keyless entry and the first authorization check; and checking an identity of the ID transmitter to determine whether the ID transmitter is valid, without comparing the instant of last movement of the ID transmitter.

11. The method as claimed in claim 1, further comprising:

requesting, by the authorization device, the ID transmitter to transmit the instant of last movement of the ID transmitter to the authorization device.

12. A vehicle comprising:

an engine;

a door; and an authorization device to:

receive from a portable ID transmitter over a wireless communication link, an instant of last movement of the ID transmitter as captured by a motion sensor included in the ID transmitter, compare, in a first authorization check, the instant of last movement of the ID transmitter as captured by the motion sensor with a predetermined interval of time, permit keyless entry to the vehicle only if the instant of last movement of the ID transmitter as captured by the motion sensor is within the predetermined interval of time, perform, in a second authorization check, whether entry to the vehicle was permitted via keyless entry and the first authorization check, the first authorization check being performed before the second authorization check, and permit keyless starting of the vehicle if entry to the vehicle was permitted by keyless entry and the first authorization check.

\* \* \* \* \*